United States Patent [19]
Lemke

[11] 3,847,802
[45] Nov. 12, 1974

[54] METHOD AND APPARATUS FOR TREATING WASTE MATERIAL

[75] Inventor: Arthur A. Lemke, Evanston, Ill.

[73] Assignee: FMC Corporation, Chicago, Ill.

[22] Filed: Apr. 19, 1973

[21] Appl. No.: 352,544

[52] U.S. Cl.............. 210/7, 210/195, 210/197, 210/527, 210/533
[51] Int. Cl............................................ C02c 1/08
[58] Field of Search............. 210/3, 4, 5, 7, 14, 15, 210/194, 195, 197, 220, 221, 525, 527, 534, 528, 533

[56] References Cited
UNITED STATES PATENTS

| | | | |
|---|---|---|---|
| 2,144,386 | 1/1939 | Nordell | 210/195 X |
| 3,764,011 | 10/1973 | Owens | 210/197 X |
| 3,206,032 | 9/1965 | Nottingham et al. | 210/195 |
| 3,591,492 | 7/1971 | Neuspiel | 210/7 |
| 3,337,057 | 8/1967 | Bolton | 210/527 |
| 2,452,991 | 11/1948 | Butcher | 210/197 |

FOREIGN PATENTS OR APPLICATIONS 1,904,206  4/1970  Germany ............. 210/195

Primary Examiner—Samih N. Zaharna
Assistant Examiner—Robert H. Spitzer
Attorney, Agent, or Firm—Dressler, Goldsmith, Clement & Gordon, Ltd.

[57] ABSTRACT

A method and apparatus for treating waste material is disclosed and includes an aeration tank and a settling tank that have a common wall. The aerated mixture is passed from the aeration tank through ports in the common wall to allow sludge to settle to the settling tank bottom. The settled sludge is then withdrawn and returned to the aeration tank through conduit means that have an opening located below the level of the ports in the common wall. The open end of the conduit, located below the level of liquid in the aeration tank, is periodically closed and the sludge being withdrawn overflows from an opening in the conduit means to an open channel for "wasting" sludge from the aeration and settling tank.

17 Claims, 5 Drawing Figures

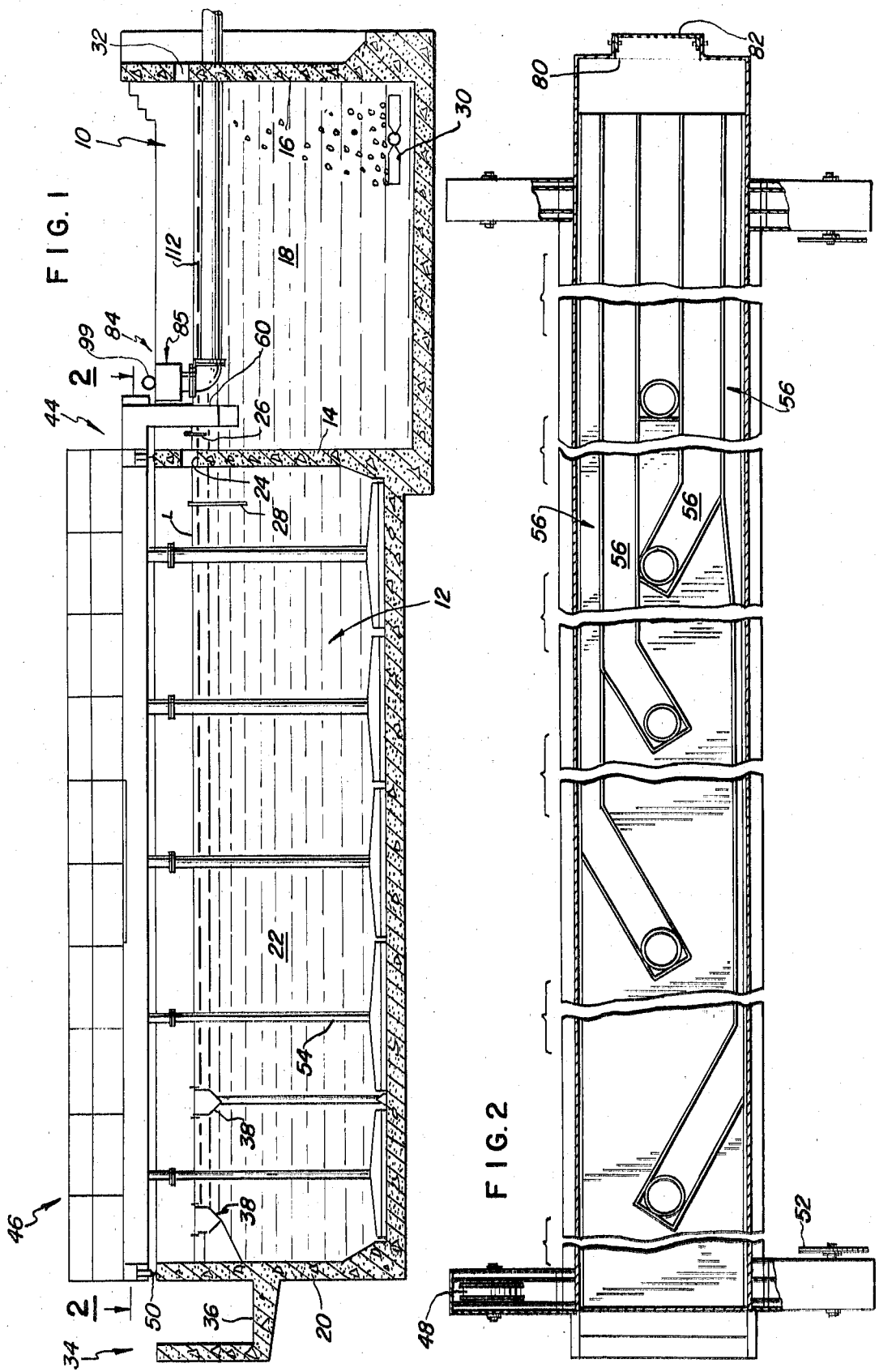

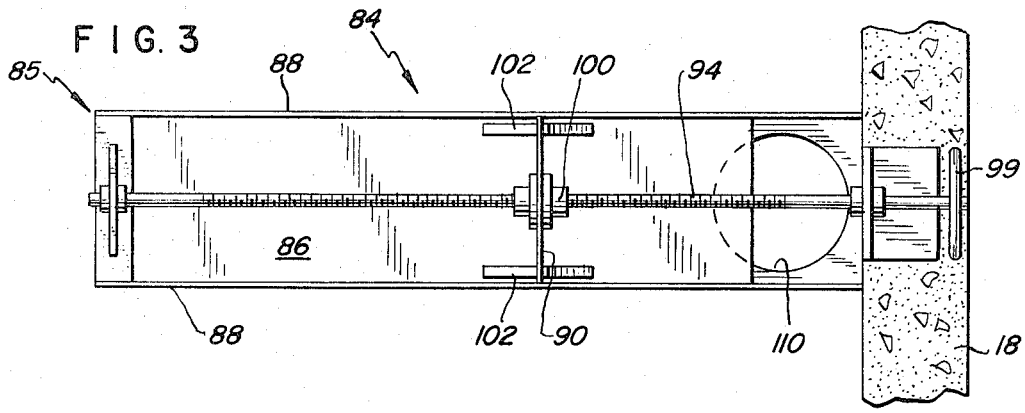
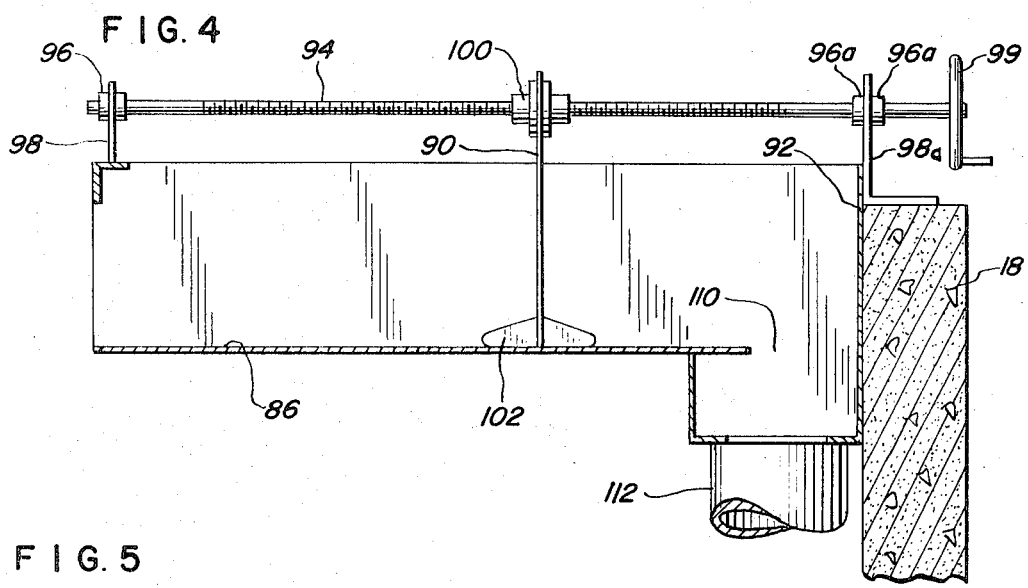
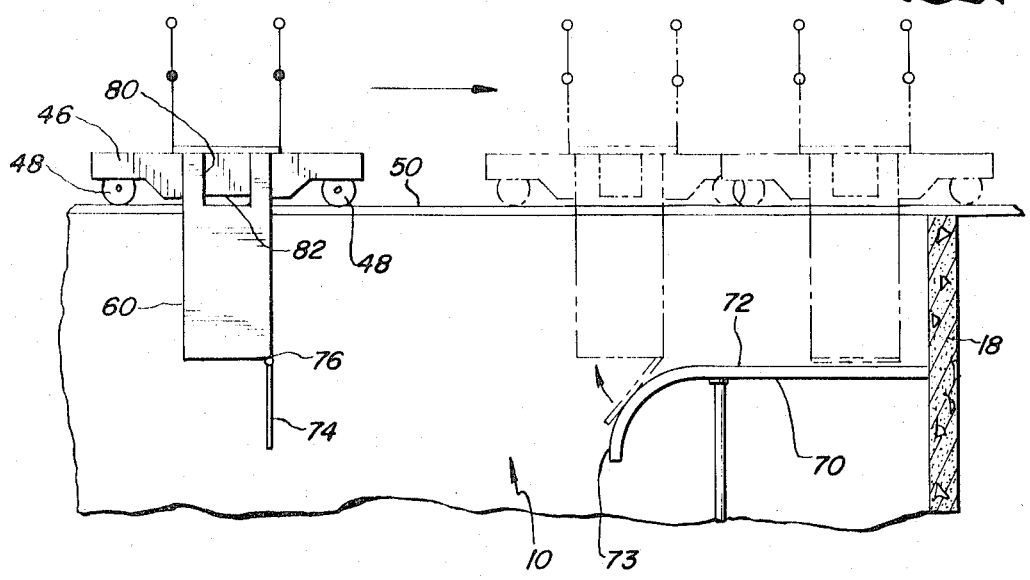

3,847,802

METHOD AND APPARATUS FOR TREATING WASTE MATERIAL

BACKGROUND OF THE INVENTION

The present invention relates generally to sewage treatment and more particularly to a method and apparatus for treating aqueous waste materials.

In the treatment of waste materials, one type of treatment plant is an activated sludge treatment facility for treating sewage and industrial waste. In the activated sludge process, the waste materials are delivered to an aeration tank where oxygen is dispersed into the mixture in quantities to satisfy a substantial portion of the Bio-Chemical Demand. The aeration mixture is then delivered to a settling tank where activated sludge settles to the bottom of the tank.

In the treatment of waste materials by the activated sludge system, the sludge that settles to the bottom of the settling tank is returned to the aeration tank for further oxygen treatment. During the removal of the settled sludge from the settling tank and return to the aeration tank, a portion of the sludge that is withdrawn is "wasted." The wasting of sludge involves removing a certain portion of the sludge that is withdrawn from the settling tank and delivering this material to a collection zone for final disposition.

In most activated sludge systems, the amount of sludge that is "wasted" is determined by various conditions in the system. In some plants, it may therefore be necessary to vary the amount of sludge that is "wasted" for a given type of operation.

In recent years, it has been proposed to utilize rectangular settling and aeration tanks with a common wall between the tanks for substantially reducing the space required for such treatment facilitates. In tanks of this type, the material in the aeration tank is usually delivered to the settling tank through ports in the common wall that are located in close proximity but slightly below the level of the liquid in both tanks. With such tanks, difficulties have been encountered. For example, normally, the sludge that is withdrawn from the settling tank is deposited directly onto the surface of the liquid in the aeration tank at a location close to the common wall. It has been found that the sludge that is returned to the aeration tank flows directly back to the settling tank without being further aerated.

SUMMARY OF THE INVENTION

The present invention provides a novel method and apparatus for transferring sludge from a settling tank into an aeration tank and deposits the sludge in the aeration tank at a location that will prevent immediate return to the settling tank. The sludge withdrawal means incorporates a simple and inexpensive mechanism for automatically "wasting" a predetermined amount of sludge during each cycle of operation and the amount can readily be varied by a manual adjustment.

The apparatus of the present invention for treating aqueous material includes aeration and settling tanks having a common wall with ports adjacent the upper end of the wall to allow aerated waste material to flow from the aeration tank to the settling tank. The sludge from the aerated waste material settles to the tank floor and is returned to the aeration tank through withdrawal means that include a vertical conduit in the aeration tank with the withdrawal means having an open end located below the ports in the common wall. Sludge wasting means cooperate with the vertical conduit to periodically divert sludge for collection outside the aeration tank.

The sludge wasting means consists of a fixed member in the aeration tank aligned with the open end of the conduit to close the open end and overflow means in the withdrawal means through which the sludge flows when the open end is closed with a collection means for receiving the sludge flowing through the overflow means.

In its specific embodiment, the sludge withdrawal means also includes a valve element that is freely pivoted on the bottom of the conduit and the valve element is pivoted to a closed position by a fixed member which has an arcuate camming surface at one end that progressively pivots the valve element from the opened to the closed position. Also, the collection means consists of an open topped channel that has end walls with one of the end walls being movable by drive means to vary the length of the channel and thereby vary the amount of sludge that is wasted during each cycle of operation.

The method of the present invention contemplates flowing an aerated mixture from an aeration tank to a settling tank and returning the sludge that settles to the bottom of the settling tank to the aeration tank through conduit means that have an open end below the liquid level in the aeration tank. This will cause the sludge to be directed downwardly below the level of the ports to prevent immediate return to the settling tank. The open end of the conduit means is periodically closed to "waste" sludge from the system.

In the specific embodiment, the two tanks are rectangular with a common wall and the sludge is returned by reciprocating a traveling bridge between opposite walls of the tank and the conduit means including a plurality of withdrawal conduits depending from the bridge.

BRIEF DESCRIPTION OF SEVERAL VIEWS OF DRAWINGS

FIG. 1 shows a vertical cross-section of an aeration tank and settling tank having a common wall;

FIG. 2 is a sectional plan view through the withdrawal means, as viewed generally along lines 2—2 of FIG. 1;

FIG. 3 is an enlarged plan view of the collection means for wasting sludge;

FIG. 4 is a vertical section of the collection means shown in FIG. 3; and

FIG. 5 is a side elevational view of the withdrawal means.

DETAILED DESCRIPTION

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

FIG. 1 of the drawings shows an aeration tank 10 and a final settling tank 12 that have a common wall 14. Aeration tank 10 is rectangular in plan view and includes an end wall 16 opposite wall 14, as well as two side walls 18 (only one being shown). Likewise, settling tank 12 has an end wall 20 and opposite walls 22 (only one being shown) to define a rectangular structure.

Common wall 14 has a plurality of ports 24 that define communicating means between the two tanks for delivering aqueous waste material from the aeration tank to the settling tank. The ports 24 are located at a common horizontal plane adjacent the upper end of wall 14 and the respective tanks have baffles 26 and 28 that are located on opposite sides of the ports 24 and spaced therefrom. The baffles have upper and lower edges that are located above and below the liquid level in the tank. The baffle 26 will reduce the velocity or energy of the material passing through ports 24 to prevent any disturbing currents in the settling tank 12. Baffle 28 extends a substantial distance downwardly below the level of the liquid in settling tank 12 to insure that the aqueous waste material is directed downwardly towards the bottom of settling tank 12.

Aeration tank 10 has a plurality of diffusers 30 for supplying oxygen to the aqueous waste material being received into tank 10 through inlet ports 32.

Rectangular settling tank 12 also has outlet means 34, spaced from the ports or communicating means 24, for receiving the clarified liquid. The outlet means consists of an outlet trough 36 that communicates through conduits (not shown) with weir troughs 38 that are located inside the settling tank 12. The weir troughs have bottom walls and side walls and the upper edges of the side walls define weirs over which the clarified liquid flows from the settling tank and these edges define the liquid level in the tank.

In the apparatus so far described, aqueous waste material is delivered to aeration tank 10 through ports 32 where air diffusers 30 supply oxygen to the waste material and the aerated mixed liquors flow from aeration tank 10 through ports 24 into settling tank 12. In settling tank 12, the activated sludge settles to the tank bottom while the clarified liquid flows over the upper edges of the side walls of weir troughs 38 and passes to trough 36. The activated sludge that settles to the tank bottom 12 is withdrawn through withdrawal means 44 for further processing.

In a system such as this, the majority of the activated sludge is directed back into the aeration tank, and this sludge is commonly called the "return" or "seed" sludge. A small percentage of the activated sludge is directed elsewhere for further processing and this sludge is commonly referred to as "excess" or "waste" sludge.

In the present invention, the withdrawal means or conduit means 44 is constructed to insure that the activated return sludge is delivered to the aeration tank at a point where it will be mixed with the waste material in the tank before being returned to the settling tank and the apparatus also incorporates sludge wasting means that periodically diverts sludge for collection outside of the aeration tank.

As shown in FIGS. 1 and 2, withdrawal means 44 consists of a bridge 46 that is supported by wheels 48 on rails 50 that are located along the upper edge of walls 14 and 20. One of the pairs of wheels 48 is driven by motor means (not shown) connected to sprockets 52. Bridge 46 supports a plurality of eductor tubes 54 that are of the inverted T-shaped type and each of the tubes opens into an individual open-topped conduit or channel 56. The opposite ends of the respective open-topped conduits 56 communicate with the upper end of a vertical conduit 60 which has its upper end in communication with the bottoms of conduits 56 and its lower open end extending into aeration tank 10.

In the operation of the withdrawal means so far described, the sludge that settles to the bottom of the tank is withdrawn through vertical conduit means that may have motors or air lifts (not shown) cooperating therewith and the sludge flows by gravity in the open-topped conduits or channels 56 and ultimately into aeration tank 10 through the vertical conduit 60. It will be noted that the lower open end of the vertical conduit 60 is located below the level of the liquid L in aeration tank 10 and also located substantially below the ports 24 in common wall 14. This will insure that the activated sludge that is returned to the aeration tank will mix with the waste material in the tank for further processing. The location and operation of the diffusers also assists in the mixing in the aeration tank. With diffusers 30 located adjacent wall 16, a counterclockwise circulation will be created so that the flow of material adjacent wall 14 will be in the downward direction.

The withdrawal means or conduit means 44 also incorporates sludge wasting means that cooperate with the vertical conduit to periodically divert sludge for collection outside the aeration tank. The sludge wasting means is designed so that the amount of sludge that is "wasted" during each cycle of reciprocal movement of the bridge may readily be changed by a minor adjustment.

The sludge wasting means consists of means for closing the lower open end of the conduit 60 and overflow means in the withdrawal or conduit means through which the sludge flows when the open end is closed. The means for closing the lower open end of conduit 60 is most clearly shown in FIG. 5 and consists of a fixed member or plate 70 that is located in aeration tank 10 and is aligned with the path of movement of the conduit 60. Fixed member or plate 70 has an upper surface 72 that is substantially in vertical alignment with the lower end of conduit 60.

In the specific embodiment illustrated, the means for closing the conduit also includes a valve element 74 that is pivoted about a pivot axis 76 along one side of the lower end of the rectangular conduit 60. The lower surface of the valve element therefore engages the upper surface of the fixed member 70 as the bridge approaches the side wall 18 of aeration tank 10. This will automatically cause the valve element to move from its open position shown in the solid line in FIG. 5 to the closed position shown in the dotted line of FIG. 5. To assist in closing the valve element 74, fixed member 70 may have an inclined arcuate camming surface portion 73 that will act as a guide surface during the approach and closing of the valve element. The radius of curvature of the arcuate surface 73 will determine the time required for moving the valve element from the fully open to the fully closed position.

When the valve element 74 is in the closed position, the sludge that is being withdrawn through vertical conduits 54 will collect in conduit 60 and will rapidly fill the conduit. Thereafter, the sludge that is collected by the withdrawal means flows by gravity through overflow means, such as weir plate 82 that may be vertically adjustable in an opening or slot 80 extending from the upper edge of the conduit 60.

The material that passes through the overflow means is collected by collection means 84 that is most clearly shown in FIGS. 1, and 4. The amount of sludge that flows into collection means 84 will be to a large measure determined by the length or distance that the fixed member or plate 70 extends from side wall 18 of the aeration tank.

The collection means 84 consists of an open-topped substantially U-shaped channel 85 that has a bottom wall 86 and a pair of vertical side walls 88 extending from the opposite edges of bottom wall 86. The channel also has two end walls 90 and 92. End wall 90 of the open-topped channel is movable to vary the length of the channel. The details of the movable means are shown in FIGS. 3 and 4 and consist of a threaded rod 94 that is rotatably supported in a bearing 96 carried by bracket 98 and collars 96a secured to rod 94 on opposite sides of bracket 98a with a crank 99 secured to one end of the rod. A nut 100 is secured to the upper end of the end wall 90 and is threadedly received on rod 94 while the lower end of plate 90 has shoes 102 that are guided along the bottom wall of the U-shaped channel. Rotation of rod 94 in the appropriate direction will move the plate or end wall 90 along the channel and vary the distance that it is spaced from fixed wall 92.

The material that flows into the channel between end walls 90 and 92 passes through opening 110 in the bottom wall 86 and is received into conduit 112 which extends outside the aeration tank so that the "wasted" sludge can be delivered to another location for final disposition.

It should be noted that the channel 84 is designed so that it is possible to eliminate "wasting" of sludge to build the collection of sludge in aeration tank 10, such as when starting a plant. This is accomplished by extending floor 86 of channel 85 close enough to wall 18 so that movable wall 90 can be positioned close enough to wall 18 to have all of the material passing through overflow means 80, 82 returned to aeration tank 10.

Summarizing the present invention, the waste material to be treated is received into aeration tank 10 through ports 32 where the material has oxygen supplied thereto from diffusers 30. The aerated waste material then flows through ports 24 into settling tank 12 where the aerated sludge settles to the tank bottom while the clarified liquid flows over the upper edges of weir troughs 38 and into outlet trough 36. The aerated or activated sludge is then withdrawn through the conduit means consisting of eductor tubes 54, channels 56, and vertical conduit 60. Since the lower open end of conduit 60 is located substantially below the ports 24 and the sludge is directed downwardly, the activated sludge enters the tank 10 at a location substantially below the liquid level L and the downward current of the liquid in the aeration tank insures proper mixing.

As the reciprocating bridge 46 approaches one side of the tanks, the valve element 74 will be moved from its open to its closed position to collect the sludge in the conduit means. The sludge that is collected then flows over overflow means 80, 82 and into the open channel 85 where it is delivered through conduit 112 for final disposition. It will be appreciated that the amount of sludge that is actually "wasted" will depend upon the spacing between the end walls 90 and 92 and it is preferable to have the fixed member 70 have a length equal to or greater than the length of channel 85. With this arrangement sludge will be flowing into the channel 85 throughout the length and the amount that actually flows into conduit 112 will depend on the position of wall 90. The remainder of the sludge received in channel 85 will be returned to aeration tank 10.

While a specific embodiment of the invention has been shown and described, numerous modifications come to mind without departing from the spirit of the invention. For example, it may not be absolutely necessary to have valve element 74 as part of the means for closing the open end of the conduit 60. If the upper horizontal surface 72 of the fixed member 70 is located in vertical alignment with the lower edge of the rectangular conduit 60, the fixed member would act as a closing element for the conduit without the use of the valve element. Also, the particular type of withdrawal means could take any number of forms. For example, the individual eductor tubes 54 could be connected directly to conduit 60 through closed conduits rather than the open-topped channels 56, or the tubes 54 could open into a common continuous channel increasing in width to the point of discharge into conduit 60.

While only one fixed member 70 and associated collection means 84 has been shown, it will be appreciated that any number of such units could be located at spaced locations along the tank between opposed walls 18 particularly if the valve element is not used. The vertical conduit could be rectangular, as shown, or circular as well as oval in cross-section.

What is claimed is:

1. Apparatus for treating aqueous waste material comprising an aeration tank and a settling tank having a common wall, said settling tank having a tank floor; means defining ports adjacent the upper end of said wall to allow waste material including liquid and aerated sludge to flow from said aeration tank to said settling tank, said aerated sludge settling to the tank floor; and withdrawal means movable along the settling tank floor for withdrawing settled aerated sludge from the tank floor and returning the sludge to said aeration tank, said withdrawal means including a vertical conduit in said aeration tank with an open end of said conduit located below the ports in said common wall; and means cooperating with said vertical conduit to periodically divert sludge for collection outside said aeration tank, said means cooperating with said vertical conduit including means for closing said open end of said conduit, overflow means in said withdrawal means through which said sludge flows when said open end is closed and collection means for receiving the sludge flowing through said overflow means.

2. Apparatus as defined in claim 1, in which said means for closing includes a fixed member in said aeration tank, said fixed member having an upper surface substantially vertically aligned with said open end.

3. Apparatus as defined in claim 2, in which said means for closing includes a valve element freely pivoted on the bottom of said conduit, said member pivoting said valve element from an open to a closed position.

4. Apparatus as defined in claim 3, in which said member has an inclined camming surface adjacent one end thereof to progressively pivot said valve element from the open to the closed position.

5. Apparatus as defined in claim 4, in which said camming surface is arcuate.

6. Apparatus as defined in claim 1, in which said collection means includes an open-topped channel having end walls with at least one of said end walls being movable to vary the length of said channel.

7. Apparatus as defined in claim 6, further including drive means for moving said movable end wall along said channel.

8. Apparatus as defined in claim 1, in which said overflow means includes an adjustable weir in an opening in a vertical wall of said conduit.

9. Apparatus as defined in claim 1, in which said settling tank is rectangular and said withdrawal means is reciprocated between opposed walls of said tank.

10. Apparatus for treating aqueous waste material comprising adjacent aeration and settling tanks, said settling tank having a tank bottom; communicating means between said tanks for delivering aqueous waste material from said aeration tank to said settling tank for separation by gravity into settled sludge on said settling tank bottom and clarified liquid; outlet means in said settling tank spaced from said communicating means for receiving clarified liquid; conduit means having a portion movable along the tank bottom for withdrawing settled sludge from the tank bottom and returning the settled sludge to the aeration tank, said conduit means having an open end in said aeration tank and an opening above said open end; means for temporarily closing said open end during movement of said conduit means along the tank bottom to collect sludge for flow through said opening; and means aligned with said opening while said open end is closed to receive sludge flowing from said opening.

11. Apparatus as defined in claim 10, in which said settling tank is rectangular and said conduit means is reciprocated across the tank between opposed walls of said tank and in which said means for temporarily closing said open end includes a fixed member in said aeration tank.

12. Apparatus as defined in claim 11, in which said means for temporarily closing said open end includes a valve element freely pivoted adjacent said open end of said conduit with said fixed member pivoting said valve element from an open to a closed position.

13. Apparatus as defined in claim 10, in which said means aligned with said opening includes an open topped channel having end walls with means for moving at least one end wall to vary the length of said channel.

14. Apparatus as defined in claim 10, in which said aeration and settling tanks have a common vertical wall and in which said communicating means includes ports in said wall, said open end of said conduit means being located below said ports.

15. A method of treating aqueous waste material comprising the steps of aerating the waste material in an aeration tank; flowing the aerated mixture from the aeration tank to a settling tank where the sludge settles to the tank bottom; returning settled sludge to the aeration tank through conduit means having an open end below the liquid level in the aeration tank; periodically closing the open end of the conduit means to collect the sludge; and overflowing the collected sludge into a trough for wasting sludge from the aeration and settling tanks.

16. A method as defined in claim 15, in which the aeration and settling tanks have a common wall and the aerated mixture flows through ports adjacent the upper portion of the common wall and in which the open end of the conduit means is located below the ports and directs the sludge downwardly.

17. A method as defined in claim 16, in which the settling tank is rectangular and the sludge is returned to the aeration tank by reciprocating withdrawal means between opposed walls of the settling tank.

* * * * *